(12) United States Patent
Lemaire et al.

(10) Patent No.: US 9,919,453 B2
(45) Date of Patent: Mar. 20, 2018

(54) METHOD FOR DRILLING AN OPHTHALMIC LENS IN A HELICAL TRAJECTORY AND ASSOCIATED DRILLING DEVICE

(71) Applicant: ESSILOR INTERNATIONAL (COMPAGNIE GENERALE D'OPTIQUE), Charenton-le-Pont (FR)

(72) Inventors: Cedric Lemaire, Charenton-le-Pont (FR); Sebastien Pinault, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 29 days.

(21) Appl. No.: 14/778,929

(22) PCT Filed: Mar. 17, 2014

(86) PCT No.: PCT/FR2014/050614
§ 371 (c)(1),
(2) Date: Sep. 21, 2015

(87) PCT Pub. No.: WO2014/147327
PCT Pub. Date: Sep. 25, 2014

(65) Prior Publication Data
US 2016/0059439 A1    Mar. 3, 2016

(30) Foreign Application Priority Data

Mar. 22, 2013 (FR) .................................. 13 52605

(51) Int. Cl.
*B28D 1/18* (2006.01)
*B23C 3/02* (2006.01)
(Continued)

(52) U.S. Cl.
CPC .................. *B28D 1/18* (2013.01); *B23C 3/02* (2013.01); *B28D 1/143* (2013.01); *G05B 19/182* (2013.01);
(Continued)

(58) Field of Classification Search
CPC .................. B23C 3/02; B23C 2220/52; Y10T 409/307616
See application file for complete search history.

(56) References Cited

U.S. PATENT DOCUMENTS 4,943,191 A * 7/1990 Schmitt .................. B23G 5/184
408/1 R
5,080,538 A * 1/1992 Schmitt .................. B23G 5/184
409/66
(Continued)

FOREIGN PATENT DOCUMENTS

DE        102010029445 A1 * 12/2011 ............... B23C 3/02
EP             3006176 A1 *  4/2016 ........... B24B 19/009
(Continued)

OTHER PUBLICATIONS

Description WO 2007104844 A1 obtained at https://worldwide.espacenet.com/ (last visited Jun. 29, 2017).*
(Continued)

*Primary Examiner* — Sunil K Singh
*Assistant Examiner* — Ryan Rufo
(74) *Attorney, Agent, or Firm* — Young & Thompson (57) ABSTRACT

A method for drilling an ophthalmic lens (10) includes the following steps: —memorizing the desired shape and dimensions of a drill hole (701; 702; 703) to be drilled in the ophthalmic lens (10) and the position of the opening of this drill hole on one of the faces (11, 12) of the ophthalmic lens; —positioning a drilling tool (80) facing the memorized position of the hole to be drilled; —determining a control
(Continued)

setpoint for the transverse movement and axial advance of the drilling tool; and —drilling the ophthalmic lens according to the control setpoint. The control setpoint for the transverse movement and axial advance of the drilling tool forces the point of this drilling tool, on at least one drilling run, to follow a helical or pseudohelical trajectory depending on the desired shape and dimensions of the drill hole. An associated drilling device is also described.

13 Claims, 5 Drawing Sheets

(51) Int. Cl.
*B28D 1/14* (2006.01)
*G05B 19/18* (2006.01)

(52) U.S. Cl.
CPC *B23C 2220/52* (2013.01); *G05B 2219/45129* (2013.01); *Y10T 409/307616* (2015.01)

(56) References Cited

U.S. PATENT DOCUMENTS

| | | | |
|---|---|---|---|
| 5,285,598 A | 2/1994 | Arita et al. | |
| 5,378,091 A * | 1/1995 | Nakamura | B23Q 11/1023 279/20 |
| 5,429,459 A * | 7/1995 | Palm | B23G 1/34 408/222 |
| 5,733,078 A * | 3/1998 | Matsushita | B23G 5/182 408/222 |
| 6,869,259 B2 * | 3/2005 | Lebkuechner | B23C 3/18 29/557 |
| 6,979,154 B2 * | 12/2005 | Mina | B23C 5/109 407/113 |
| 7,487,005 B2 * | 2/2009 | Kakino | G05B 19/19 700/173 |
| 2006/0233623 A1 * | 10/2006 | Andoh | B23G 1/32 409/66 |
| 2008/0069656 A1 * | 3/2008 | Volokh | B23C 3/02 409/200 |
| 2012/0051863 A1 * | 3/2012 | Craig | B23B 51/08 408/1 R |
| 2012/0219371 A1 * | 8/2012 | Craig | B23C 3/02 408/1 R |

FOREIGN PATENT DOCUMENTS

| | | |
|---|---|---|
| FR | 2 969 017 A1 | 6/2012 |
| FR | 2 975 027 A1 | 11/2012 |
| JP | 53-007715 A | 1/1978 |
| JP | 07-108523 A | 4/1995 |
| JP | 3031878 U | 9/1996 |
| JP | 2004-009201 A | 1/2004 |
| WO | 2006/103649 A2 | 10/2006 |
| WO | 2007/104844 A1 | 9/2007 |

OTHER PUBLICATIONS

Tool and Manufacturing Engineers Handbook, Drozda et al., vol. 1, p. 9-84 (1983).*
International Search Report dated Jun. 2, 2014 in corresponding PCT application.
French Search Report dated Jun. 2, 2014, in corresponding French application.

* cited by examiner

METHOD FOR DRILLING AN OPHTHALMIC LENS IN A HELICAL TRAJECTORY AND ASSOCIATED DRILLING DEVICE

TECHNICAL FIELD OF THE INVENTION

Generally, the present invention relates to the field of methods for drilling ophthalmic lenses.

It relates more particularly to a method for drilling an ophthalmic lens, comprising the following steps of:
  storing the desired shape and dimensions of a drill hole in the lens and the position at which this drill hole opens onto one of the faces of the lens,
  positioning a drilling tool opposite the stored position of the hole to be drilled,
  determining a control setpoint for the transverse movement and the axial feed of the drilling tool,
  drilling the lens in accordance with said control setpoint.

The invention also relates to an associated drilling device.

PRIOR ART

When the frame is of the rimless type, the trimming of the ophthalmic lens and, where applicable, the flattening of sharp edges (chamfering) are followed by the appropriate drilling of the lens so as to allow the temples and the bridge of the rimless frame to be attached.

Some drill holes can also be made for esthetic or non-functional reasons.

Drilling can be carried out on a grinder or on a separate drilling machine. In order to carry out the drilling on a machine incorporating trimming means, this machine is then provided, in addition to the trimming means, with specific means for drilling.

A number of drilling methods are known.

During a single-feed drilling operation, the tip of a tool is positioned on one of the faces of the ophthalmic lens intended to be drilled, at the location desired for this hole to open onto this face of the lens.

The lens is then drilled by means of relative axial feed mobility of the drilling tool relative to the lens along the rotation axis of the tool. The movement of the tip of the tool then takes place on a rectilinear trajectory along the rotation axis of this drilling tool.

In order to produce holes of different sizes and/or different shapes with a single drilling tool, document WO2007/104844 discloses the implementation of a particular drilling method referred to as drilling by contouring.

Drilling by contouring is carried out in the following way. Once the desired shape and dimensions of the drill hole to be produced and the position of this hole on the surface of the lens have been stored, the drilling tool is positioned opposite the stored position of the hole to be drilled.

In a first step, the lens is then drilled, to the entire desired depth of the hole or to a part of this depth, by a single feed of the tool along its rotation axis. Then, in a second step, the tip of the tool, which is engaged in the lens, is moved transversely, that is to say in a plane perpendicular to the rotation axis of this drilling tool, in the manner of a milling cutter, along a trajectory in this plane which depends on the desired shape and dimensions for the drill hole.

This method of drilling by contouring has the drawback of taking a long time to implement, in particular when the ophthalmic lens to be drilled is very thick.

Moreover depending on the depth of the hole to be drilled and the strength of the material of the lens, it may be necessary to carry out a plurality of alternate successive feed and transverse movement steps.

This is all the more damaging when the lens to be drilled is thick and the material of the lens is difficult to drill. This is because, in these particular cases, it is also necessary to slow down the speed of progression of the tool so that it does not break. The time taken to carry out drilling is thus increased further.

The increase in the time taken to carry out drilling is a drawback that is all the more significant since it can result in the material of the lens heating up and in the formation of cracks, or even in the lens breaking following propagation of these cracks.

SUBJECT OF THE INVENTION

In order to remedy the abovementioned drawback of the prior art, the present invention proposes a new drilling method that allows holes with different shapes and/or dimensions to be drilled with a single drilling tool, this method being quick and easy to implement.

More particularly, the invention proposes a drilling method in which the control setpoint for the transverse movement and the axial feed of the drilling tool causes the tip of this drilling tool, during at least one drilling pass, to follow a helical or pseudo-helical trajectory depending on the desired shape and dimensions of the drill hole.

Further nonlimiting and advantageous features of the method according to the invention are as follows:
  the control setpoint for the transverse movement and the feed of the drilling tool is determined as a function of at least one mechanical and/or geometric characteristic of the lens that is different from the desired shape and dimensions of the drill hole;
  the control setpoint for the transverse movement and the feed of the drilling tool is determined as a function of at least the thickness of the lens;
  the control setpoint for the transverse movement and the feed of the drilling tool is determined as a function of at least the material of the lens;
  the control setpoint for the transverse movement of the drilling tool is determined as a function of at least one mechanical and/or geometric characteristic of the drilling tool;
  the feed rate of the drilling tool is determined as a function of the depth of the position of the tip of the drilling tool with respect to the lens;
  the control setpoint for the drilling tool comprises a single pass that results in the drill hole being drilled with the desired shape and dimensions of the drill hole;
  the control setpoint for the drilling tool comprises at least two passes, with a first pass resulting in the hole being drilled with transverse dimensions that are less than the desired transverse dimensions of the hole and with the desired depth of the hole, and a second pass resulting in the hole being drilled with the desired transverse dimensions of the hole and the desired depth of this hole;
  the control setpoint for said first pass causes the drilling tool to move more quickly than in the case of the control setpoint for the second pass, which causes the tip of the drilling tool to follow the helical or pseudo-helical trajectory;
  the control setpoint for said first pass causes the drilling tool to follow the helical or pseudo-helical trajectory and the control setpoint for the second pass causes an axial feed of the tool without transverse movement or causes a transverse movement of the tool without axial feed;

the control setpoint is determined dynamically during the drilling of the lens.

The invention also relates to a CNC drilling device comprising a drilling tool and means for controlling this tool in accordance with the above-described drilling method.

Advantageously, the drilling tool is also suitable for trimming the lens.

DETAILED DESCRIPTION OF AN EXEMPLARY EMBODIMENT

The description which follows with reference to the appended drawings, which are given by way of nonlimiting examples, will make it easy to understand what the invention consists of and how it can be achieved.

In the appended drawings.

By way of preamble, it will be noted that identical or corresponding elements of the various embodiments shown in the figures will, as far as possible, be identified by the same reference signs and will not be described each time.

FIGS. 1 to 5 show an ophthalmic lens 10. This ophthalmic lens 10 is intended to be mounted in a frame of the "rimless" type. To this end, at least two holes 701; 702; 703 have to be drilled in each ophthalmic lens 10 in order to allow the securing of a temple and the bridge of the frame.

Figure 6:
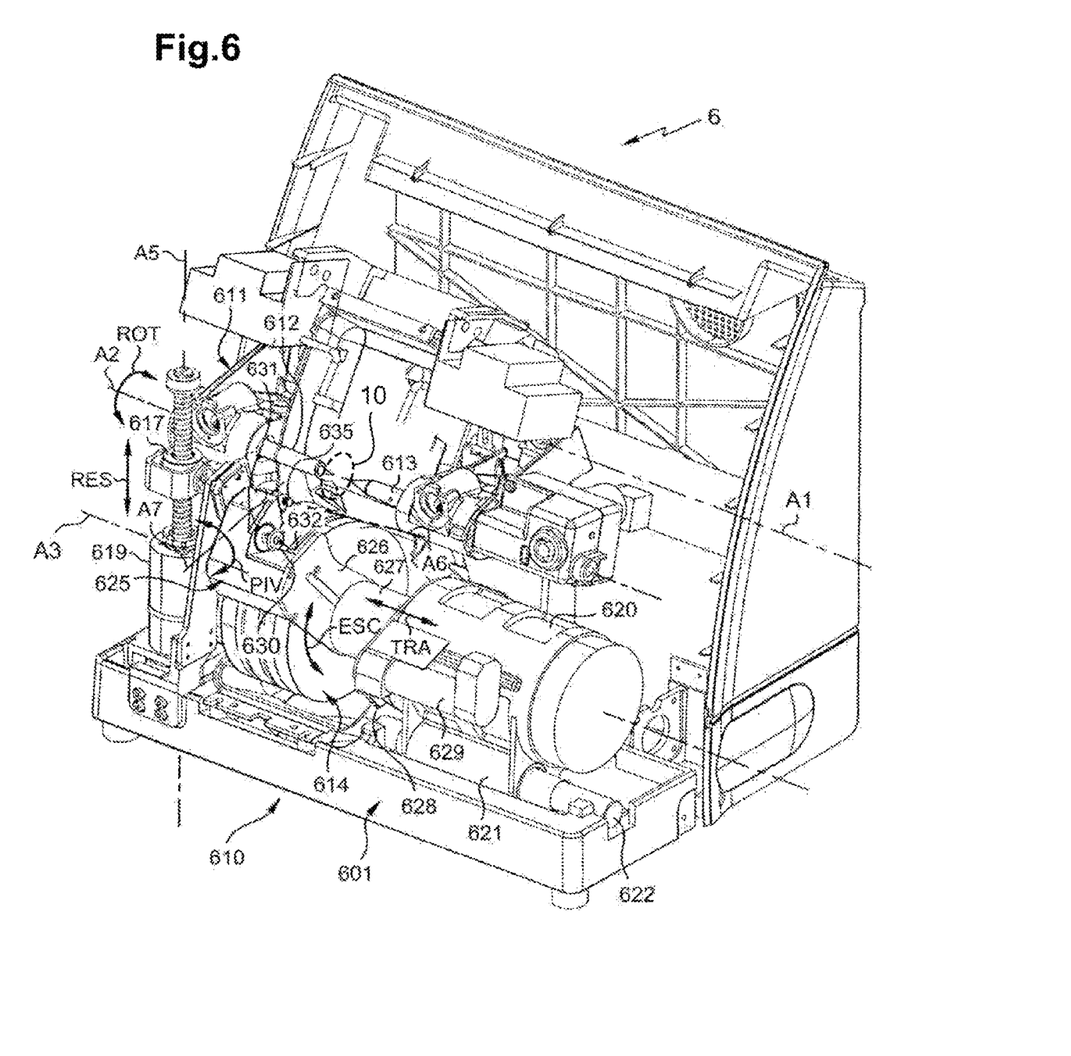
Figure 7:
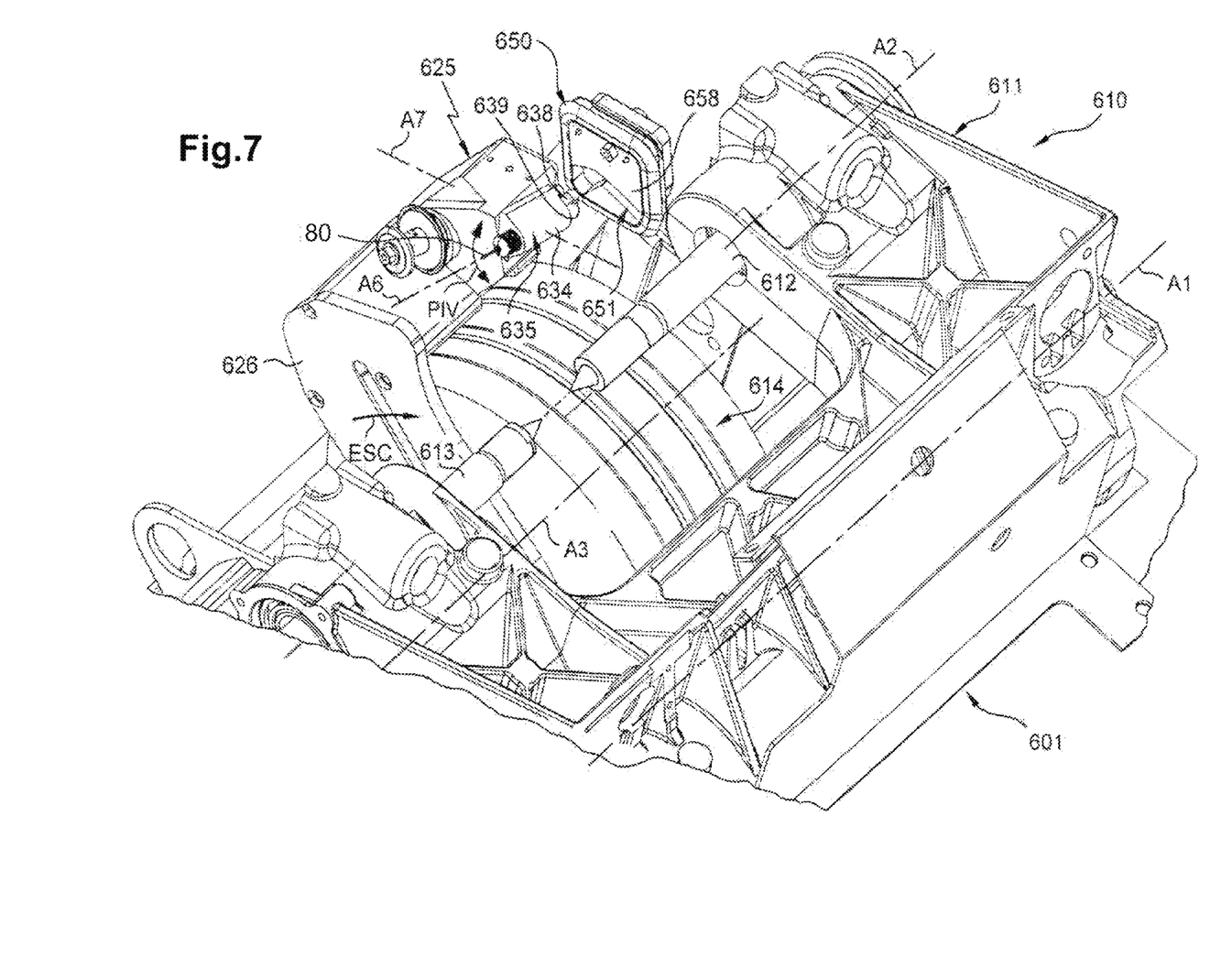
FIG. 7 is a schematic perspective view of a drilling module of the trimming and drilling device from FIG. 6.

For this purpose, the ophthalmic lens 10 is disposed in a trimming and drilling device 6 according to the invention, which is shown in FIGS. 6 and 7 and described in more detail below. This trimming and drilling device 6 comprises in this case a drilling tool 80.

This trimming and drilling device 6 is in this case advantageously suitable both for trimming and for drilling the ophthalmic lens 10. As a variant, the ophthalmic lens 10 could be disposed in a dedicated drilling device comprising a similar drilling tool.

A drilling tool 80 is understood here as meaning a drill bit comprising at least one cutting edge that generates, during the rotation of this tool about its rotation axis, a cutting surface suitable for hollowing out the drill hole 701; 702; 703 in the ophthalmic lens. This cutting surface may be for example cylindrical, conical or hemispherical.

The tip of the tool is understood to mean the center of its free end.

The cutting surface covers in this case the free end of the drilling tool and a part of the lateral surface of revolution of this tool.

Depending on the ratio between the length of this cutting surface along the rotation axis of the drilling tool 80, known as the useful length of the drilling tool, and the overall length of the drilling tool, reference is made to a short- or long-edged tool.

The tool 80 can thus for example consist of a short-edged slotting end mill. This slotting end mill has for example the following dimensions: a diameter of 1.2 millimeters and a useful length of 1.2 millimeters.

The tool 80 can also be formed by a milling cutter cut along the entire length of this tool along the drilling axis. Such a milling cutter has for example a diameter of 0.8 or 1 millimeter and a useful length of 8 millimeters, which is the total length of this tool.

The short-edged drilling tool has the advantage of being more rigid than the long-edged tool, since the cutting edge extends along a shorter length thereof. This short-edged drilling tool is thus less fragile and the risks of the tool breaking are limited.

However, the internal surface state of the hole drilled with the short-edged drilling tool can be less satisfactory than that obtained with the long-edged drilling tool because it may be necessary to carry out a number of drilling passes in order to drill the hole with the desired depth in the ophthalmic lens.

This will be explained in more detail below.

FIG. 6 shows the trimming and drilling device 6 equipped with a drilling module 625 for implementing the method according to the invention.

The trimming and drilling device 6 comprises means for trimming and means for drilling the ophthalmic lens 10.

Trimming Means

The trimming function of the trimming and drilling device 6 can be realized in the form of any machine for cutting off or removing material that is suitable for modifying the contour of the ophthalmic lens in order to adapt it to that of the rim of a selected frame or to the final shape of the ophthalmic lens desired for a rimless frame. Such a machine can consist for example of a machining tool of the grinder, laser cutting machine or water-jet cutting machine type, etc.

As shown in FIG. 6, the trimming device comprises, in a manner known per se, an automatic grinder 610, commonly referred to as a CNC grinder. This grinder 610 comprises, in this case, a rocker 611 which is mounted so as to be freely pivotable about a first axis A1, in practice a horizontal axis, on a framework.

In order to immobilize and drive the rotation of the ophthalmic lens 10 to be machined, the grinder 610 is equipped with support means that are able to clamp and drive the rotation of the ophthalmic lens 10. These support means comprise two clamping and rotational drive shafts 612, 613. These two shafts 612, 613 are aligned with one another along a second axis A2, referred to as the blocking axis, parallel to the first axis A1. The two shafts 612, 613 are driven in rotation synchronously by a motor (not shown), via a common drive mechanism (not shown) installed on the rocker 611. This common synchronous rotational drive mechanism is of a standard type, known per se.

As a variant, provision could also be made for the two shafts to be driven by two separate motors that are mechanically or electronically synchronized.

The trimming and drilling device 6 also comprises an electronic and computerized control system (not shown)

such as an integrated microcomputer or a set of dedicated integrated circuits programmed to control the rotation ROT of the shafts 612, 613.

The shaft 613 is capable of translational movement along the blocking axis A2, facing the other shaft 612, in order to clamp the lens in axial compression between the two blocking tips. The shaft 613 is controlled in this axial translational movement by a drive motor via an actuating mechanism (not shown) controlled by the electronic and computerized control system. The other shaft 612 is fixed in translation along the blocking axis A2.

The grinder 610 furthermore comprises in this case a set of at least one grinding wheel 614 that is secured against rotation on a third axis A3 parallel to the first axis A1, and which is also duly driven in rotation by a motor (not shown).

In this case, the grinder 610 comprises a set of several grinding wheels 614 that are mounted coaxially on the third axis A3, for roughing and finishing the edging of the ophthalmic lens to be machined. These different grinding wheels are each suited to the material of the trimmed lens and to the type of operation carried out (roughing, finishing, mineral or synthetic material, etc.).

The set of grinding wheels is attached to a common shaft of axis A3 that drives their rotation during the edging operation. This common shaft, which is not visible in the presented figures, is controlled in its rotation by an electric motor 620 controlled by the electronic and computerized control system.

The set of grinding wheels 614 is also capable of translational movement along the axis A3 and is controlled in this translational movement by a controlled motorized system. Specifically, the assembly consisting of the set of grinding wheels 614, its shaft and its motor is borne by a carriage 621 which is itself mounted on glideways 622 secured to the structure in order to slide along the third axis A3. The translational movement of the carriage 621 bearing the grinding wheels is referred to as "transfer" and denoted TRA in FIG. 3. This transfer is controlled by a motorized drive mechanism (not shown), such as a screw/nut or screw/rack system, controlled by the electronic and computerized control system.

In order to allow dynamic adjustment of the inter-axis distance between the axis A3 of the grinding wheels 614 and the axis A2 of the lens during edging, use is made of the ability of the rocker 611 to pivot about the axis A1. Specifically, this pivoting causes the ophthalmic lens clamped between the shafts 612, 613 to move, in this case approximately vertically, thereby moving the lens toward or away from the grinding wheels 614. This mobility, which allows restitution of the desired edge shape programmed in the electronic and computerized control system, is referred to as restitution and is denoted RES in the figures. This restitution mobility RES is controlled by the electronic and computerized control system.

In order to machine the ophthalmic lens to a given contour, it is therefore necessary to move a nut 617 along the fifth axis A5, under the control of the motor 619, in order to control the restitution movement, and on the other hand, to make the supporting shafts 612, 613 pivot together about the second axis A2, in practice under the control of the motor controlling them. The transverse restitution movement RES of the rocker 611 and the rotational movement ROT of the shafts 612, 613 of the lens are controlled in a coordinated manner by an electronic and computerized control system (not shown) of this trimming and drilling device, duly programmed for this purpose so that all the points on the contour of the ophthalmic lens are successively brought down to the correct diameter.

The grinder 610 illustrated in FIG. 6 additionally comprises a finishing module 625 which carries chamfering and grooving wheels 630, 631 mounted on a common axis 632 and which is able to move with a degree of mobility, in a direction substantially transverse to the axis A2 of the shafts 612, 613 that hold the lens and to the axis A5 of the restitution RES. This degree of mobility is referred to as retraction and is denoted ESC in the figures.

In this case, this retraction consists in pivoting of the finishing module 625 about the axis A3. Specifically, the module 625 is borne by a lever 626 secured to a tubular sleeve 627 mounted on the carriage 621 so as to pivot about the axis A3. In order to control its pivoting, the sleeve 627 is provided, at its end away from the lever 626, with a gearwheel 628 which meshes with a pinion (not visible in the figures) with which the shaft of an electric motor 629 secured to the carriage 621 is equipped.

In summary, it will be noted that the degrees of mobility that are available on such a trimming grinder are:
  rotation of the lens, allowing the lens to be rotated about its holding axis, which is on the whole normal to the overall plane of the lens,
  restitution, which consists in relative transverse mobility of the lens (that is to say in the overall plane of the lens) with respect to the grinding wheels, making it possible to reproduce the various radii that describe the contour of the desired shape of the lens,
  transfer, which consists in relative axial mobility of the lens (that is to say perpendicularly to the overall plane of the lens) with respect to the grinding wheels, making it possible to position the lens and the chosen trimming grinding wheel opposite one another,
  retraction, which consists in relative transverse mobility, in a different direction than the direction of restitution, of the finishing module with respect to the lens, making it possible to bring the finishing module into a position of use and to put it away.

Drilling Means

As far as the drilling function is concerned, the module 625 is provided with a drilling device 635, the spindle of which is equipped with a chuck for fixing the drilling tool 80 along a drilling axis A6 (see FIG. 7).

The drilling device 635 is mounted on the module 625 so as to pivot about an orientation axis A7 substantially transverse to the axis A3 of the grinding wheels 614 and to the restitution axis A5 and, as a result, substantially parallel to the direction of retraction ESC of the module 625. The drilling axis A6 is thus able to be oriented about the orientation axis A7, that is to say in a plane close to the vertical. This orientational pivoting of the drilling device 635 is denoted PIV in FIG. 7. This is the only degree of mobility dedicated to drilling.

The integration of the drilling function into a trimming machine means that the tool is suitably positioned facing the position of the hole to be drilled in the lens. This positioning is carried out by means of two pre-existing degrees of mobility, independently of the drilling function, which are retraction ESC on the one hand and transfer TRA on the other. These two degrees of mobility, of retraction and transfer, are additionally used to adjust the orientation of the drilling axis A6 of the drilling device 635.

In order to be pivot mounted on the module 625, the body 634 of the drilling device 635 has a cylindrical sleeve of axis A7 which is housed with pivoting in a corresponding bore of like axis A7 formed in the body of the module 625. The drilling device 635 can thus pivot about the orientation axis A7 through a range of angular positions corresponding to as many inclinations of the drilling axis A6 with respect to the lens to be drilled when the module 625 comes into the drilling position. This range of angular positions is physically delimited by two angular end stops secured to the body of the module 625.

In the example illustrated, the means for adjusting the orientation comprise a finger 638 that is secured to the body 634 of the drilling device 635 and is provided with a spherical end 639, and a plate 650 that bears a camway 651 and is secured to the structure 601 of the grinder.

The plate 650 has a flat working face 658 which is substantially perpendicular to the transfer direction TRA, or, in other words, in the example illustrated, to the axes A2 and A3. Since the axes A2 and A3 are in this case horizontal, the working face 658 of the plate 650 is vertical. When the module 625 is in its angular range of adjustment, the working face 658 of the plate 650 is located facing the end 639 of the finger 638 of the drilling device 635. The camway of the plate 650 is formed by a trench 651 sunk into the working face 658 of the plate 650.

In use, the inclination of the drilling axis A6 about the orientation axis A7 is adjusted automatically, under the control of the electronic and computerized control system, using the transfer TRA and retraction ESC mobilities of the module in order to bring the finger 638 of the drilling device into engagement with the cam plate 650.

The trimming and drilling device 6 finally comprises means for storing the desired shape and dimensions of a drill hole 701; 702; 703 in the lens, also referred to as hole to be drilled, and the position of this hole on the surface of the lens. These storage means can be formed by a rewritable memory and an interface (for example a keyboard and a screen) for writing to this memory. They are for example integrated into the electronic and computerized control device.

Drilling Method

The drilling method according to the invention comprises first of all a step of storing the desired shape and dimensions of the drill hole 701; 702; 703 in the lens and the position of this hole 701; 702; 703 on the surface of the lens by the storage means of the trimming and drilling device 6.

This information can for example be entered manually into the rewritable memory of the electronic and computerized control device.

As a variant, the latter can also comprise communication means suitable for receiving this information in the form of a pre-formatted file.

Figure 1:
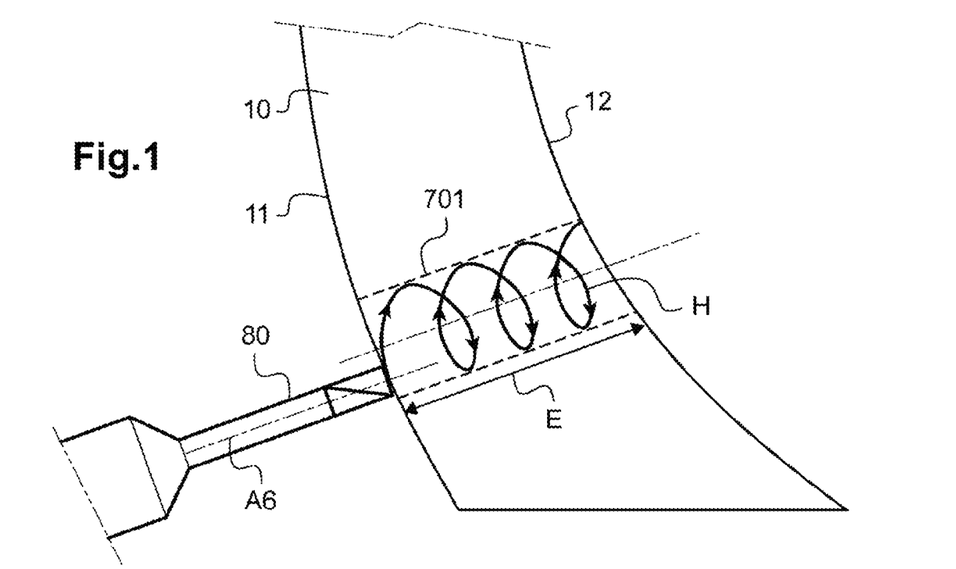
FIG. 1 is a schematic profile view of an ophthalmic lens and of a drilling tool showing the trajectory of the tip of the tool in the lens according to a first embodiment of the drilling method according to the invention.

The surface of the ophthalmic lens 10 in question is generally its front, convex face 11 with respect to the tip of the drilling tool 80.

As a variant, it is conceivable for the surface of the ophthalmic lens 10 on which the position of the drill hole is identified to be the rear face 12 of this ophthalmic lens 10, which is concave.

Next, the electronic and computerized control system of the trimming and drilling device 6 is programmed to determine a control setpoint for the transverse movement and the feed of the drilling tool 80 that is suitable for drilling the hole 701; 702; 703 of which the characteristics of shape, dimensions and position have previously been stored.

Remarkably, in this case, this control setpoint for the transverse movement and the axial feed of the drilling tool causes the tip of this drilling tool 80, during at least one drilling pass, to follow a helical or pseudo-helical trajectory H; H1, H2; H3 depending on the desired shape and dimensions of the drill hole 701; 702; 703.

The expression "axial feed" of the drilling tool is understood to mean here an axial movement of this tool in the direction of the rotation axis of this tool 80, which corresponds to the above-described drilling axis A6.

The expression "transverse movement" of the drilling tool is understood to mean here a movement of this tool in a plane orthogonal to the rotation axis of the this tool 80.

Here, the axial and transverse movements are preferably translational movements.

The expression "helical or pseudo-helical trajectory" is understood to mean here the path corresponding to a movement of the tip of the tool that results from the composition of a rectilinear translational movement in the direction of the rotation axis of the drilling tool and of a translational movement in a plane orthogonal to this direction, along a closed contour, the shape of which is that of the desired cross section of the hole.

In the most common case, in which the hole to be drilled has a circular cross section, the trajectory of the tip of the drilling tool is then a helical trajectory corresponding to a movement of the tip of the tool that results from the composition of a rectilinear translational movement in the direction of the rotation axis of the drilling tool and a circular translational movement about a circle.

In the case of a hole for esthetic purposes, the cross section of this hole may have any desired shape, for example a square shape with rounded corners. The trajectory of the tip of the drilling tool is then a pseudo-helical trajectory corresponding to a movement of the tip of the tool that results from the composition of a rectilinear translational movement in the direction of the rotation axis of the drilling tool and a translational movement in a plane orthogonal to this direction along a contour corresponding to the desired cross section of the hole, for example a contour that outlines a square.

In this case, the drilling tool moves with its rotation axis R which always remains oriented in the same way. The drilling tool thus moves as a whole in a helical or pseudo-helical translational movement.

This helical or pseudo-helical trajectory of the tool involves a simultaneous axial feed and transverse movement of the drilling tool which are never zero.

As is explained in more detail below, the control setpoint for the drilling tool is first of all determined as a function of the desired dimensions of the hole 701; 702; 703: axial dimension, measured along an axis substantially perpendicular to the face of the ophthalmic lens that is oriented toward the drilling tool, coincident in practice with the rotation axis of the drilling tool, and transverse dimensions, measured in a plane perpendicular to this axis that is substantially perpendicular to the face of the ophthalmic lens that is oriented toward the drilling tool.

In practice, these are most commonly the depth and the diameter of the hole 701; 702; 703 when the latter has a cylindrical shape.

More specifically, various embodiments of this method are conceived of depending on the relative dimensions of the tool 80 and of the drill hole 701; 702; 703.

The examples shown in FIGS. 1 to 5 and described below correspond to the case of a hole to be drilled with a circular cross section.

Figure 2:
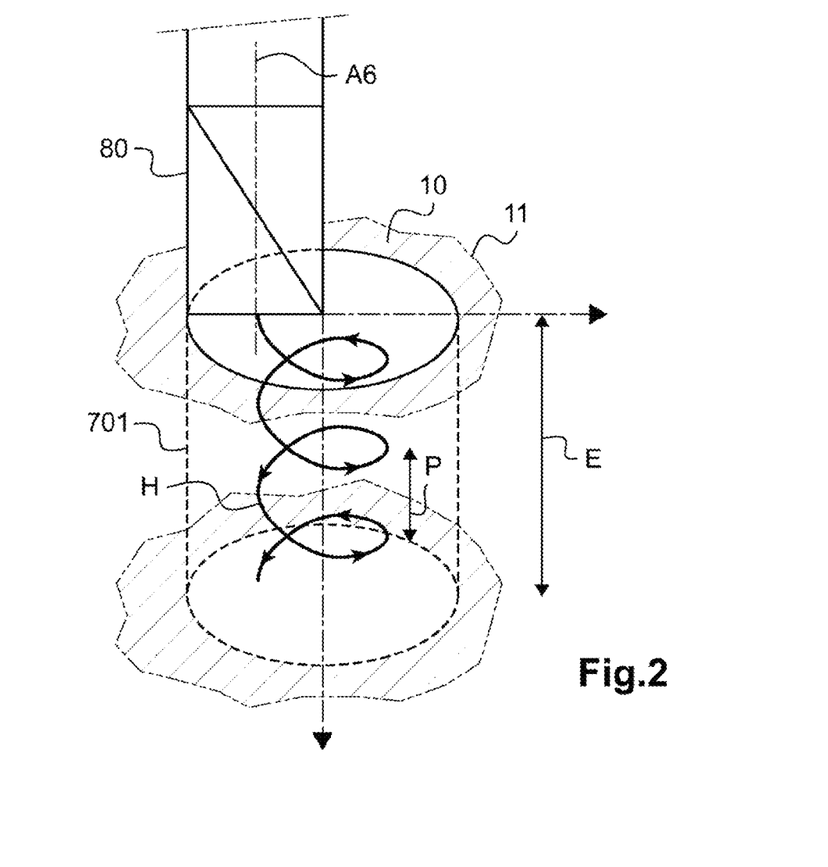
FIG. 2 is a schematic perspective view of the ophthalmic lens from FIG. 1, with the hole drilled by the tool and the trajectory of the tip of the tool in this lens.
Figure 3:
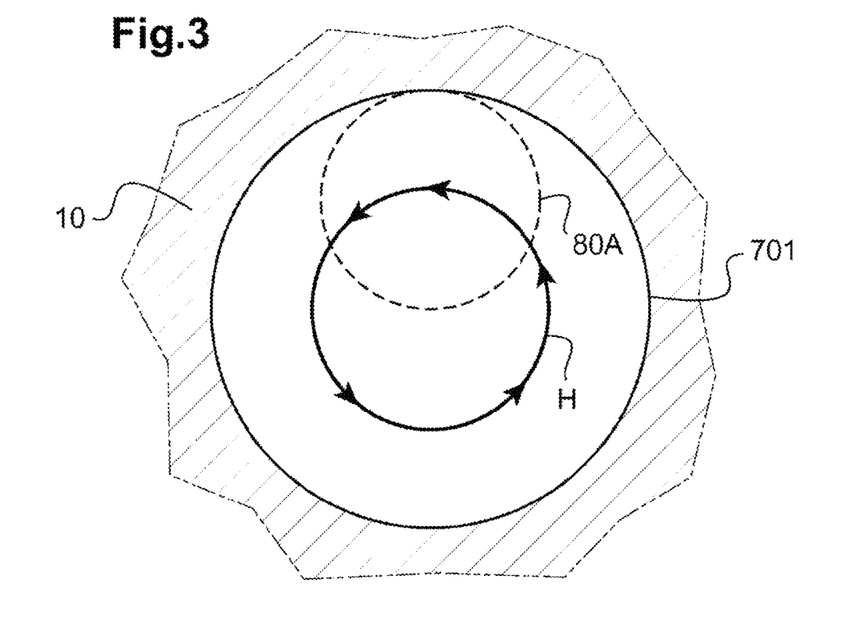
FIG. 3 is a schematic top view of the trajectory of the tip of the drilling tool from FIG. 1.

According to a first embodiment, shown schematically in FIGS. 1 to 3, use is made of a drilling tool 80 of which the cutting surface 80A, shown by way of dotted lines in FIG.

3, has a diameter greater than or equal to the desired radius of the drill hole 701 provided in the ophthalmic lens 10.

Moreover, the drilling tool used here is a long-edged tool, or at the very least a drilling tool of which the useful length is greater than or equal to the thickness of the ophthalmic lens 10 in the region of the hole 701 to be drilled.

In this case, a single drilling pass along the helical trajectory H is sufficient to drill the hole 701 with the dimensions desired therefor, that is to say to obtain the final diameter and the final depth desired for the hole 701 of circular cross section.

The electronic and computerized control system of the trimming and drilling device 6 thus simultaneously controls the mobilities of axial feed and transverse movement of the drilling tool in order to confer on the tip of the tool 80 a helical trajectory determined such that the cutting surface 80A of the tool 80 hollows out the hole 701 to the desired dimensions and shape.

The control setpoint for the drilling tool 80 is thus determined as a function of the desired shape and dimensions of the drill hole 701 on the one hand and as a function of the geometry of the drilling tool 80 on the other.

The geometry of the drilling tool comprises in particular the radial dimensions and the useful length, along the rotation axis of the tool, of the cutting surface 80A of the tool.

The control of the drilling tool along the helical trajectory H provided according to the invention thus not only makes it possible to carry out the drilling in a reliable and rapid manner but also makes it possible to limit the risks of splintering at the front face 11 and rear face 12 of the ophthalmic lens 10 around the opening of the hole 701. The surface state of each face of the ophthalmic lens 10 is thus improved.

The drilling of the hole 701 to its final desired dimensions is in particular more rapid than when this drilling is carried out by contouring.

Figure 4:
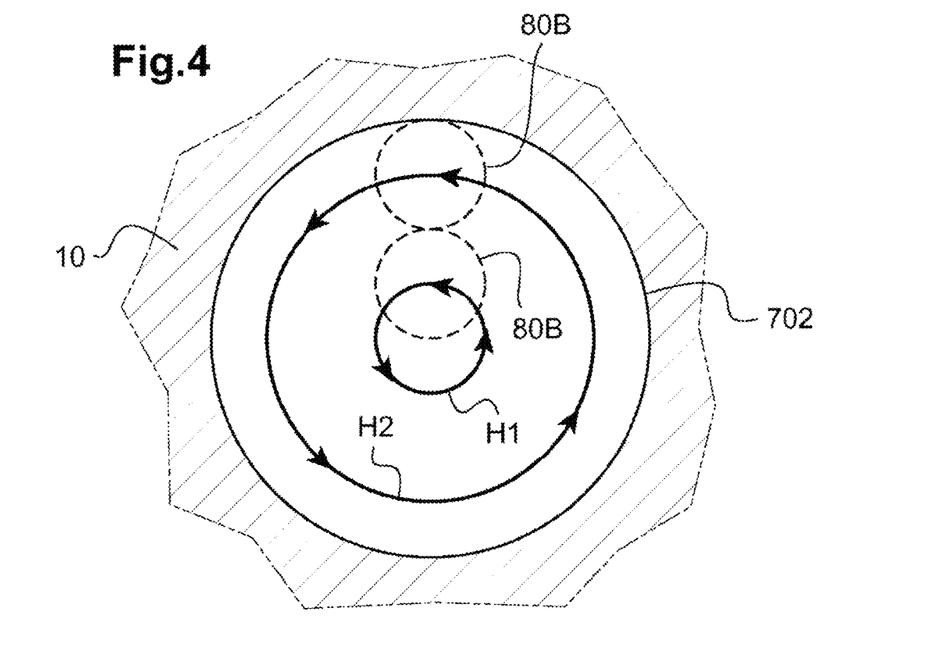
FIG. 4 is a schematic top view of the trajectory of the tip of the drilling tool according to a second embodiment of the method according to the invention.

According to a second embodiment, shown schematically in FIG. 4, use is made of a drilling tool 80 of which the cutting surface 80B has a diameter less than the desired radius of the drill hole 702 provided in the ophthalmic lens 10.

Moreover, the drilling tool used here is a long-edged tool, or at the very least a drilling tool of which the useful length is greater than or equal to the thickness of the ophthalmic lens 10 in the region of the hole 702 to be drilled.

In this case, a single drilling pass proves to be insufficient to hollow out the drill hole 702 to the final transverse and axial dimensions desired for this hole.

Thus, according to the second embodiment of the drilling method conceived of here, the control setpoint for the drilling tool comprises at least two passes, with a first pass resulting in the hole 702 being drilled with transverse dimensions that are less than the desired transverse dimensions of the hole 702 and with the desired depth of the hole, and a second pass resulting in the hole being drilled with the desired transverse dimensions of the hole and the desired depth of this hole.

The electronic and computerized control system of the trimming and drilling device 6 thus controls the mobilities of axial feed and transverse movement of the tool 80 such that at least one drilling pass out of the two necessary drilling passes is carried out with a helical trajectory of the tip of the tool 80 as defined above.

The trajectory of the tip of the tool during the other drilling pass is likewise determined by the electronic and computerized control system: it may be drilling along a rectilinear trajectory, along a helical trajectory or drilling by contouring.

It is envisioned for example, as is the case in the example of FIG. 4, that the electronic and computerized control system controls the mobilities of the drilling tool in order to carry out two successive drilling passes, each one with a helical trajectory H1, H2 of the tip of the tool 80.

For example, in order to hollow out a hole of circular cross section having a final diameter of 2.5 millimeters with a drilling tool of which the cutting surface has a diameter of 1 millimeter, the electronic and computerized control device sets a control setpoint corresponding to the first drilling pass on a first helical trajectory H1 with a diameter of 0.75 millimeter, so as to hollow out a hole with a diameter of 1.75 millimeters, and to the second drilling pass on a second helical trajectory H2 with a diameter of 1.5 millimeters.

When the final radius desired for the hole is less than three times the radius of the drilling tool, it is conceivable for the control setpoint set by the electronic and computerized control device to realize the first drilling pass on a straight trajectory, in which only the axial feed mobility of the drilling tool is implemented, and then the second drilling pass on a helical trajectory in order to enlarge the hole obtained during the first pass.

Finally, it is conceivable for said first drilling pass to be realized with a helical trajectory of the tip of the drilling tool and for the second drilling pass to be realized by contouring. In this way, the control setpoint for said first pass causes the drilling tool to move helically, that is to say with a simultaneous axial feed and transverse movement, and the control setpoint for the second pass causes a feed of the tool without transverse movement and then a transverse movement of the tool without feed.

In order to obtain a drill hole of which the desired final radius is greater than four times the radius of the drilling tool 80 used, it is obviously possible to conceive of any desired number of successive drilling passes, at least one of which is carried out with a helical trajectory of the tip of this tool.

It is advantageously conceivable for the final drilling pass, which produces the drill hole at the final desired dimensions, to be carried out by contouring.

In this way, the internal lateral surface state of the hole is improved, that is to say smoother.

In the case in which the desired cross section of the hole to be drilled has a noncircular shape, it is conceivable for only the final drilling pass, realized on a helical trajectory or by contouring, to produce the final shape of the cross section of the hole, and for the first drilling passes each to result in the drilling of a hole with a circular cross section.

The drilling setpoint comprises not only the trajectory of the tip of the drilling tool but also the movement speed of this tool along this trajectory.

This movement speed is broken down into an axial feed rate corresponding to the axial component of the speed of the drilling tool, that is to say the speed at which the tip passes into the ophthalmic lens, and a transverse movement speed corresponding to the transverse component of the speed of the drilling tool, that is to say its speed in a plane orthogonal to the rotation axis of the tool.

In the example in FIG. 2, the axial feed rate is uniform. The helical trajectory of the tip of the tool thus has a constant pitch P over the entire drilling depth.

Advantageously, the electronic and computerized control device determines a control setpoint such that the drilling pass is realized on a helical or pseudo-helical trajectory by varying the axial feed rate of the drilling tool.

Figure 5:
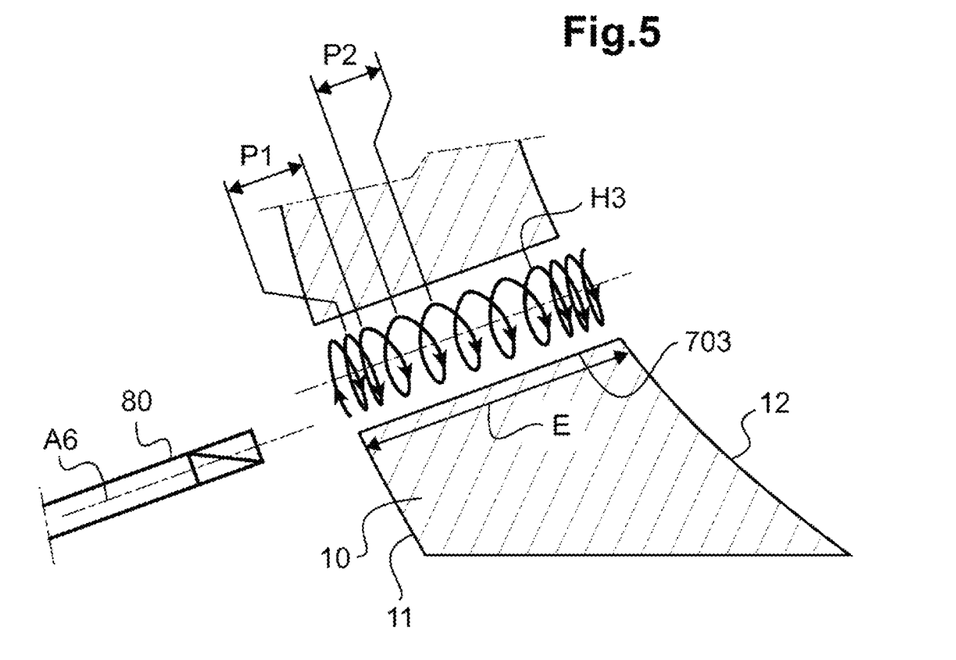
FIG. 5 is a schematic sectional view of an ophthalmic lens showing the trajectory of the tip of the tool in the lens according to a third embodiment of the drilling method according to the invention, FIG. 6 a perspective of a device for trimming and drilling an ophthalmic lens for implementing the method according to the invention.

More specifically, close to each front face 11 and rear face 12 of the ophthalmic lens 10, the axial feed rate of the tool is slower than the feed rate of the drilling tool 80 in a central part of the thickness of the ophthalmic lens 10.

Thus, according to the third embodiment in FIG. 5, in which a single drilling pass on the helical trajectory H3 is conceived of in order to obtain the drill hole 703, the pitch P1 of the helical trajectory H3 close to the front face 11 and rear face 12 of the ophthalmic lens 10 is less than the pitch P2 of this helical trajectory in the middle of the thickness of the ophthalmic lens. Consequently, with an overall movement speed of the tool along the trajectory that is constant during drilling, the axial feed rate of this tool is slower when the pitch of the trajectory is smaller, close to the front and rear faces, and the axial feed rate is greater in the middle of the thickness of the lens, when the pitch of the trajectory is greater.

In this way, the risks of splinters at the front and rear faces of the lens are limited while the duration of drilling is minimized.

Moreover, in the case of the second embodiment, with a first drilling pass on a straight trajectory and a second drilling pass on a helical or pseudo-helical trajectory, provision can be made for the first pass to be carried out at a feed rate greater than the mean feed rate of the second pass.

Generally, the control setpoint determined by the electronic and computerized control system causes the movement speed of the tool during the first drilling pass or passes to be greater than the movement speed of the tool during the final drilling pass, making it possible to achieve the desired final dimensions of the hole. The internal lateral surface state of the hole and of the faces of the lens is thus optimized.

Advantageously, the electronic and computerized control system is programmed to determine the control setpoint for the transverse movement and the feed of the drilling tool as a function, moreover, of at least one mechanical and/or geometric characteristic of the lens that is different from the desired shape and dimensions of the drill hole.

Specifically, the strength of the material forming the ophthalmic lens or its propensity to form splinters at the front and/or rear face during drilling can be taken into consideration during the determination of the control setpoint.

For example, the higher the hardness, measured in Shore A, of the material forming the lens, the more the movement speed of the drilling tool is reduced in order to limit the risks of the tool breaking during drilling.

For example, it is difficult to drill an ophthalmic lens made of polycarbonate. The feed rate of the drilling tool is thus reduced in order to drill this type of lens.

The Young's modulus of the ophthalmic lens or a variable that is characteristic of the rigidity of this lens, for example equal to a multiplication factor close to the minimum thickness of the lens multiplied by its Young's modulus, can also be taken into consideration.

Similarly, the more the material forming the lens is fragile and thus likely to form splinters, the more the movement speed of the drilling tool will be reduced in order to limit the formation of these splinters. This is the case for example in ophthalmic lenses made of the polymeric material Columbia Resin 39 (CR39) or of a polymeric material having a high refractive index, for example the materials with an index of 1.6 and 1.74.

The geometric characteristics of the ophthalmic lens 10, in particular the thickness of the lens, as mentioned above, and the distance of the hole from the peripheral edge of the lens, can also be taken into consideration.

Finally, the control setpoint can also be determined as a function of the mechanical and/or geometric characteristics of the drilling tool 80 used.

A drilling tool that has a larger diameter or is made of a more solid material will be able to withstand greater forces and thus a greater movement speed in the ophthalmic lens.

The interface of the storage means of the electronic and computerized control system can to this end allow the user to indicate the information relating to the material of the lens and to the characteristics of the drilling tool.

In practice, once the control setpoint has been determined by the electronic and computerized control system, the drilling tool 80 is positioned facing the stored position of the hole to be drilled at the starting point of the determined trajectory.

To this end, the electronic and computerized control system of the trimming and drilling device 6 controls, in an appropriately coordinated manner, the mobilities of transfer TRA of the finishing module 625 bearing the drilling module, of restitution RES of the clamping and rotational drive shafts 612, 613, of retraction ESC of the finishing module 625 and optionally of rotation ROT of the lens in order to obtain the relative mobilities of axial feed and transverse movement of the tool with respect to the lens that are necessary to realize the drill hole.

In this case, the relative feed mobility of the drilling tool with respect to the lens can be obtained by a mobility made up for example of the retraction mobility ESC of the finishing module 625 and the transfer mobility TRA of the finishing module 625. As a variant, the relative feed mobility of the drilling tool with respect to the lens can be obtained by means of a single additional mobility by the drilling tool being moved along its drilling axis with respect to the finishing module 625.

To start drilling, the lens is drilled by means of the tool disposed perpendicularly to the surface of the ophthalmic lens, at the drilling starting point.

The electronic and computerized control system controls the drilling tool in order to adjust the orientation of the tool by controlling, in an appropriately coordinated manner, the mobilities of transfer TRA, restitution RES and rotation ROT such that the drilling axis A6 is substantially coincident with the normal to the lens at the starting point in question. Once the tool has been oriented correctly, drilling is started at this starting point. The tool is then driven in rotation and moved in translation along the drilling axis A7, that is to say following its feed mobility, toward the starting point until it pierces the lens.

The drilling tool 80 is then moved in accordance with the drilling setpoint determined by the electronic and computerized control system.

During the drilling pass on the helical or pseudo-helical trajectory, the movement of the tool 80 comprises both a non-zero axial component along the rotation axis of the tool and a non-zero transverse component in a plane perpendicular to the rotation axis of the tool.

According to the first embodiment, the drilling is carried out in one "full width" pass, that is to say that the depth of the material removed is equal to the diameter of the tool.

When a plurality of passes are necessary for drilling, as in the second embodiment, the first drilling pass is carried out at full width.

Next, the following passes realize milling of the hole on trajectories of which the shape corresponds preferably, but not necessarily, to the desired shape of the hole, but with a smaller size. On each new milling pass, the trajectory of the tool is extended. After several milling passes, the tool is close to the desired contour of the hole to be produced. The tool is then controlled to carry out a milling pass in accordance with a control setpoint which corresponds directly to the desired shape and dimensions of the drill hole.

As mentioned above, this final milling pass is carried out in accordance with a control setpoint for the tool that sets a helical trajectory or causes drilling by contouring.

Exemplary embodiments for which the control setpoint is predetermined by the electronic and computerized control system before the start of drilling itself have been described here.

As a variant, it is conceivable for the control setpoint for the tool for drilling the hole to be determined dynamically during the drilling of the lens.

The control setpoint for the tool can then for example take into consideration a force exerted by the lens on the drilling tool and/or the bending amplitude of this tool during drilling, in order to limit the risks of this tool breaking.

To this end, when the force exerted on the tool and/or the bending of the drilling tool exceeds a predetermined threshold value, the axial feed rate of this tool is decreased.

The values of the force and/or the bending of the drilling tool that are taken into consideration are preferably measured during drilling.

In the case in which the drilling tool is a short-edged milling cutter, or at the very least a tool of which the useful length is less than the thickness of the lens in the region of the hole to be drilled, the electronic and computerized control system is programmed to take into consideration the fact that when the useful, i.e. edged, length of the tool has been fully introduced into the lens during drilling, the chips of lens do not have the possibility of escaping toward the outside of the lens.

Thus, in this case, the control setpoint comprises a plurality of passes, each pass resulting in the tool being introduced into the lens along a length less than the useful length of this tool. Between each pass, the tool is removed completely from the hole drilled in the lens.

In the examples shown here, the desired drill hole is a through-hole. As a variant, it is of course conceivable for the hole to be blind, that is to say not a through-hole.

Moreover, this hole can optionally open onto the edge face of the lens. It is then a notching. The method according to the invention is not changed.

The drilling method according to the invention, which sets a drilling pass on a helical trajectory, makes it possible to reduce the machining forces on the drilling tool, regardless of the dimensions of the hole intended to be drilled. It also makes it possible to reduce the time necessary for drilling.

Thus, the phenomena of bending of the drilling tool are limited: the risks of this tool breaking are reduced and the final dimensions of the drilled hole are more precise. In other words, compliance with the dimensions is improved.

Moreover, the risk of causing splinters at the front and/or rear face of the ophthalmic lens during drilling is limited.

Finally, this method advantageously allows the use of a single drilling tool, having a cutting surface of given diameter, for drilling holes with various transverse dimensions. It is possible for example to drill holes with a diameter of between 0.5 millimeter and 3 millimeters with a drilling tool with a diameter of 0.5 millimeter or else to drill holes with a diameter of between 1.0 millimeter and 6.0 millimeters with a drilling tool having a diameter of 1.0 millimeter.

This drilling tool can also be used to trim the lens, in particular when it is a short-edged milling cutter.

Finally, the use of a stepped drilling tool, a free-end part of which forms a cutting surface for drilling and another, abrasive part can be used for the finishing steps of trimming the ophthalmic lens, is also conceivable.

The invention claimed is:

1. A method for drilling an ophthalmic lens, comprising the following steps of:
    storing the desired shape and dimensions of a drill hole in the ophthalmic lens and the position at which this drill hole opens onto one of the faces of the ophthalmic lens,
    positioning a drilling tool opposite the stored position of the hole to be drilled,
    determining a control setpoint for the transverse movement and the axial feed of the drilling tool, and
    drilling the ophthalmic lens in accordance with said control setpoint,
    wherein the control setpoint for the transverse movement and the axial feed of the drilling tool causes the tip of this drilling tool, during at least one drilling pass, to follow a helical or pseudo-helical trajectory depending on the desired shape and dimensions of the drill hole, and
    wherein the axial feed of the drilling tool during said drilling pass varies so that it is slower close to each face of the ophthalmic lens than in a central part of the thickness of the ophthalmic lens.

2. The drilling method as claimed in claim 1, wherein the control setpoint for the transverse movement and the feed of the drilling tool is determined as a function of at least one mechanical or geometric characteristic of the ophthalmic lens that is different from the desired shape and dimensions of the drill hole.

3. The drilling method as claimed in claim 2, wherein the control setpoint for the transverse movement and the feed of the drilling tool is determined as a function of at least the thickness of the ophthalmic lens.

4. The drilling method as claimed in claim 2, wherein the control setpoint for the transverse movement and the feed of the drilling tool is determined as a function of at least the material of the ophthalmic lens.

5. The drilling method as claimed in claim 1, wherein the control setpoint for the transverse movement of the drilling tool is determined as a function of at least one mechanical or geometric characteristic of the drilling tool.

6. The drilling method as claimed in claim 1, wherein the feed rate of the drilling tool is determined as a function of the depth to which the tip of the drilling tool has passed into the ophthalmic lens.

7. The drilling method as claimed in claim 1, wherein the control setpoint for the drilling tool comprises a single pass that results in the drill hole being drilled with the desired shape and dimensions of the drill hole.

8. The drilling method as claimed in claim 1, wherein the control setpoint for the drilling tool comprises at least two passes, with a first pass resulting in the hole being drilled with transverse dimensions that are less than the desired transverse dimensions of the hole and with the desired depth of the hole, and a second pass resulting in the hole being drilled with the desired transverse dimensions of the hole and the desired depth of this hole.

9. The drilling method as claimed in claim 8, wherein the control setpoint for said first pass causes the drilling tool to move more quickly than in the case of the control setpoint for the second pass, which causes the tip of the drilling tool to follow the helical or pseudo-helical trajectory.

10. The method as claimed in claim 8, wherein the control setpoint for said first pass causes the drilling tool to follow the helical or pseudo-helical trajectory and the control setpoint for the second pass causes an axial feed of the tool without transverse movement or causes a transverse movement of the tool without axial feed.

11. The drilling method as claimed in claim 1, wherein the control setpoint is determined dynamically during the drilling of the ophthalmic lens.

12. A CNC drilling device comprising a drilling tool and means for controlling this tool in accordance with the drilling method in claim 1.

13. The device as claimed in claim 12, wherein the drilling tool is also capable of trimming the ophthalmic lens.

* * * * *